United States Patent
Arndt et al.

(10) Patent No.: US 9,858,107 B2
(45) Date of Patent: Jan. 2, 2018

(54) METHOD AND APPARATUS FOR RESOLVING CONTENTION AT THE HYPERVISOR LEVEL

(71) Applicant: International Business Machines Corporation, Armonk, NY (US)

(72) Inventors: Karla K. Arndt, Rochester, MN (US); Joseph W. Gentile, New Paltz, NY (US); Nicholas R. Jones, Poughkeepsie, NY (US); Nicholas C. Matsakis, Poughkeepsie, NY (US); David H. Surman, Marlboro, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 160 days.

(21) Appl. No.: 14/995,264

(22) Filed: Jan. 14, 2016

(65) Prior Publication Data
US 2017/0206103 A1 Jul. 20, 2017

(51) Int. Cl.
*G06F 9/50* (2006.01)
*G06F 9/455* (2006.01)

(52) U.S. Cl.
CPC ........ *G06F 9/45558* (2013.01); *G06F 9/5038* (2013.01); *G06F 9/5077* (2013.01);
(Continued)

(58) Field of Classification Search
CPC .................................................. G06F 9/5077
See application file for complete search history.

(56) References Cited

U.S. PATENT DOCUMENTS 6,721,775 B1 4/2004 Fagen
8,689,230 B2 4/2014 Dyck
(Continued)

FOREIGN PATENT DOCUMENTS

JP 2015038757 A 2/2015

OTHER PUBLICATIONS

Appendix P, List of IBM Patents or Patent Applications Treated as Related dated Jun. 8, 2016.
(Continued)

*Primary Examiner* — Charlie Sun
(74) *Attorney, Agent, or Firm* — Cantor Colburn LLP; William A. Kinnaman, Jr.

(57) ABSTRACT

Aspects relate to a computer system and a computer implemented method for resolving abnormal contention on the computer system. The method includes detecting, using a processor and at a hypervisor level of the computer system, abnormal contention of a serially reusable resource caused by a first virtual machine. The abnormal contention includes the first virtual machine experiencing resource starvation of computer system resources used for processing the first virtual machine, causing the first virtual machine to block the serially reusable resource from a second virtual machine that is waiting to use the serially reusable resource. The method also includes adjusting resource allocation at the hypervisor level of the computer system resources for the first virtual machine, processing the first virtual machine based on the resource allocation, and releasing the serially reusable resource by the first virtual machine in response to the first virtual machine processing.

20 Claims, 7 Drawing Sheets

(52) U.S. Cl.
CPC ................ *G06F 2009/4557* (2013.01); *G06F 2009/45595* (2013.01)

(56) References Cited

U.S. PATENT DOCUMENTS

| | | | |
|---|---|---|---|
| 9,491,112 B1* | 11/2016 | Patel | .................... H04L 47/70 |
| 2002/0107854 A1 | 8/2002 | Hua | |
| 2004/0139142 A1 | 7/2004 | Arwe | |
| 2006/0161417 A1 | 7/2006 | Hardwick | |
| 2006/0161738 A1 | 7/2006 | Saha | |
| 2007/0124545 A1 | 5/2007 | Blanchard | |
| 2007/0233450 A1 | 10/2007 | Papaefstathiou | |
| 2008/0229031 A1* | 9/2008 | Villarreal | .............. G06F 9/5088 711/153 |
| 2010/0005465 A1* | 1/2010 | Kawato | .................. G06F 9/455 718/1 |
| 2013/0080641 A1 | 3/2013 | Lui | |
| 2015/0172205 A1* | 6/2015 | Anderson | ............. G06F 9/5077 709/224 |
| 2015/0229582 A1 | 8/2015 | Zhu | |
| 2016/0019074 A1* | 1/2016 | Nahir | .................... G06F 9/5077 718/1 |
| 2017/0031698 A1* | 2/2017 | Mathews | ............ G06F 9/45558 |

OTHER PUBLICATIONS

JP2015038157—Machine Translation (61 pages).

Karla K. Arndt et al., "Method and Apparatus for Detecting Abnormal Contention on a Computer System" U.S. Appl. No. 14/995248, filed Jan. 14, 2016.

Karla K. Arndt et al., "Method and Apparatus for Resolving Contention in a Computer System" U.S. Appl. No. 14/995266, filed Jan. 14, 2016.

Munoz-Esco, F. D., et al. "Managing Transaction Conflicts in Middleware-based Database Replication Architectures" http://citeseerx.ist.psu.edu/viewdoc/download?doi=10.1.1.80.2353&rep=rep1&type=pdf (2006) 10 Pages.

\* cited by examiner

METHOD AND APPARATUS FOR RESOLVING CONTENTION AT THE HYPERVISOR LEVEL

BACKGROUND

The present disclosure relates generally to resolving abnormal contention and, more specifically, to a method and apparatus for resolving abnormal contention at a hypervisor level on a computer system for a serially reusable resource.

In computer system workloads there are often a number of transactions that make up jobs, and a number of jobs that make up a program, which are all vying for some of the same limited resources, some of which are serially reusable resources such as memory, processors, and software instances. In such computer system workloads, there may be many relationships between jobs, transactions, and programs that are increasingly dynamic creating complex resource dependency scenarios that can cause delay. For example, when a thread or unit of work involved in a workload blocks a serially reusable resource, it slows itself down and other jobs and/or transactions going on concurrently across the system, the entire system complex, or cluster of systems, which are waiting for the resource. In mission critical workloads, such delays may not be acceptable to the system and a user.

Further, a system may include Logical Partitioning (LPAR) which can include a notion of a computing weight. The computing weight can be defined as a maximum computing power allowed for a single system image running on top of LPAR. This may hamper a system image's CPU time when the computer system is run at full capacity. LPAR also has a notion of soft capping, where an artificial computing limit can be imposed upon an image, in order to control the amount of processing work a computer can perform, for example, in one hour which can be measured using a measurement such as million service units (MSU) consumed. This can take effect before the image reaches potential capacity, and can become a bottleneck. Another cause for hypervisor level resource bottlenecks can be system images configured with only a single processor which can be called a uni-processor arrangement.

Additional delays may be caused by human factors. For example, one such factor that can lead to delays in a reduction of IT staff in an IT shop or department as well as the inexperience of the IT staff below a threshold for providing sufficient support thereby causing delays. Some automation may be utilized to help alleviate delay, however, automation may not have enough intrinsic knowledge of the system to detect or make decisions regarding delays or the causes of the blocking jobs.

An operating system of the future is envisioned that can monitor such workloads and automatically resolve abnormal contention (with greater accuracy) to help recover from delays in order to provide increased availability and throughput of resources for users. These types of analytics and cluster-wide features may help keep valuable systems operating competitively at or above desired operating thresholds.

SUMMARY

In accordance with an embodiment, a method for resolving abnormal contention is provided. The method includes detecting, using a processor and at a hypervisor level of the computer system, abnormal contention of a serially reusable resource caused by a first virtual machine. The abnormal contention includes the first virtual machine experiencing resource starvation of computer system resources used for processing the first virtual machine, causing the first virtual machine to block the serially reusable resource from a second virtual machine that is waiting to use the serially reusable resource. The method also includes adjusting resource allocation at the hypervisor level of the computer system resources for the first virtual machine, processing the first virtual machine based on the resource allocation, and releasing the serially reusable resource by the first virtual machine in response to the first virtual machine processing.

In accordance with another embodiment, a computer system for resolving abnormal contention is provided. The computer system includes a memory having computer readable instructions, and one or more processors for executing the computer readable instructions. The computer readable instructions includes detecting, using a processor and at a hypervisor level of the computer system, abnormal contention of a serially reusable resource caused by a first virtual machine. The abnormal contention includes the first virtual machine experiencing resource starvation of computer system resources used for processing the first virtual machine, causing the first virtual machine to block the serially reusable resource from a second virtual machine that is waiting to use the serially reusable resource. The computer readable instructions also includes adjusting resource allocation at the hypervisor level of the computer system resources for the first virtual machine, processing the first virtual machine based on the resource allocation, and releasing the serially reusable resource by the first virtual machine in response to the first virtual machine processing.

In accordance with a further embodiment, a computer program product for resolving abnormal contention includes a non-transitory storage medium readable by a processing circuit and storing instructions for execution by the processing circuit for performing a method. The program instructions executable by a processor to cause the processor to detect, at a hypervisor level of a computer system, abnormal contention of a serially reusable resource caused by a first virtual machine. The abnormal contention includes the first virtual machine experiencing resource starvation of computer system resources used for processing the first virtual machine, causing the first virtual machine to block the serially reusable resource from a second virtual machine that is waiting to use the serially reusable resource. The program instructions executable by a processor to cause the processor to also adjust resource allocation at the hypervisor level of the computer system resources for the first virtual machine, process the first virtual machine based on the resource allocation, and release the serially reusable resource by the first virtual machine in response to the first virtual machine processing.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The forgoing and other features, and advantages are apparent from the following detailed description taken in conjunction with the accompanying drawings in which.

DETAILED DESCRIPTION

Figure 1A:
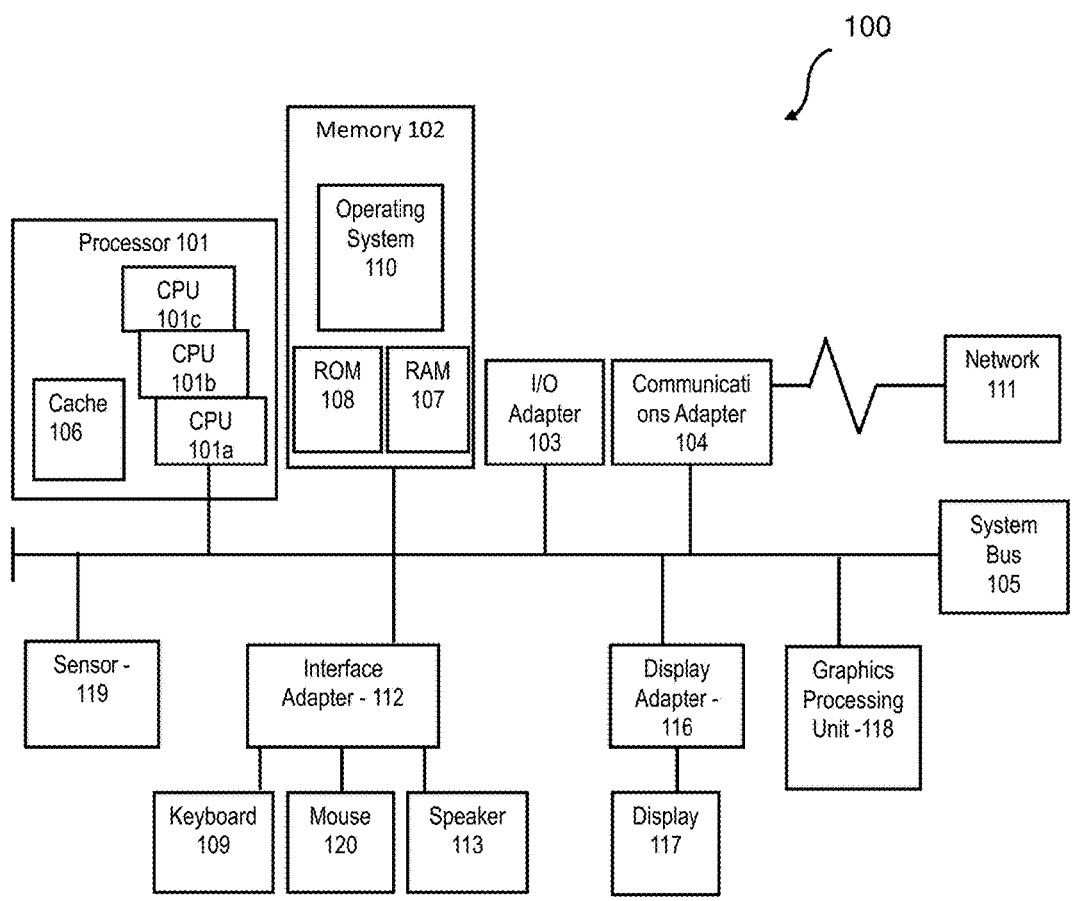
FIG. 1A depicts a block diagram of a computer system in accordance with some embodiments of this disclosure.

It is understood in advance that although this disclosure includes a detailed description on a single computer system, implementation of the teachings recited herein are not limited to a computer system and environment. Rather, embodiments of the present invention are capable of being implemented in conjunction with any other type of virtualized computing environment now known or later developed such as systems that include multiple computers or clusters of systems on which a virtualized machine environment can be implemented.

Embodiments described herein are directed to resolving abnormal contention. For example, in this disclosure one or more hypervisor level methods and apparatus for a system to resolve abnormal contention delays resulting from access to serially reusable resources is introduced. A serially reusable resource is any part of a system that can be used by more than one program, job, and/or thread but for which access must be controlled such that either the serially reusable resource can be used one at a time only (exclusive access which is usually akin to making updates or if there is only one) or the resource can be shared simultaneously, but only if the program, job, and/or threads are only reading. One or more of the disclosed embodiments help in resolving abnormal delays that occur during obtaining and releasing serialization in a virtualized machine environment at the hypervisor level. One or more of the disclosed embodiments focus on situations where a currently processing guest program image, also called a virtual machine or guest machine, which is currently holding ownership of a serially reusable resource, is starved of processor resources while blocking a shared serialization resource in a constrained environment.

Turning now to FIG. 1, an electronic computing device 100, which may also be called a computer system 100 that includes a plurality of electronic computing device sub-components, any one of which may include or itself be a serially reusable resource, is generally shown in accordance with one or more embodiments. Additionally, a virtualized machine environment can be implemented at a hypervisor level on one or more of the plurality of electronic computing device sub-components. FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc. According to another embodiment, the computer system 100 may be an embedded computer system. For example, the embedded computer system 100 may be an embedded system in a washing machine, an oil drilling rig, or any other device that can contain electronics.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Communications adaptor 104 may be operatively connect computer 100 to one or more networks 111. System bus 105 may also connect one or more user interfaces via interface adaptor 112. Interface adaptor 112 may connect a plurality of user interfaces to computer 100 including, for example, keyboard 109, mouse 120, speaker 113, etc. System bus 105 may also connect display adaptor 116 and display 117 to processor 101. Processor 101 may also be operatively connected to graphical processing unit 118.

Further, the computer 100 may also include a sensor 119 that is operatively connected to one or more of the other electronic sub-components of the computer 100 through the system bus 105. The sensor 119 can be an integrated or a standalone sensor that is separate from the computer 100 and may be communicatively connected using a wire or may communicate with the computer 100 using wireless transmissions.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 110. Operating system 110 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 120. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 111.

Network 111 can be an IP-based network for communication between computer 100 and any external device. Network 111 transmits and receives data between computer 100 and external systems. In an exemplary embodiment, network 111 can be a managed IP network administered by a service provider. Network 111 may be implemented in a wireless fashion, e.g., using wireless protocols and technologies, such as WiFi, WiMax, etc. Network 111 can also be a packet-switched network such as a local area network, wide area network, metropolitan area network, Internet network, or other similar type of network environment. The network 111 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 110, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

According to one or more embodiments, any one of the electronic computing device sub-components of the computer 100 includes, or may itself be, a serially reusable resource that receives a number of job requests and on which a virtualized computer environment can be implemented. According to one or more embodiments, a job is abstract and can include a program, a thread, a process, a subsystem, etc., or a combination thereof. Further, according to one or more embodiments, a job can include one or more threads within a program or different programs. Accordingly, one or more contention events may occur at any such serially reusable resource element caused by a plurality of program images vying for resources while one of those virtual program image, which may also be referred to as a virtual machine, is being starved of processing abilities. These virtual machines, or program images, are monitored by a hypervisor or virtual machine monitor (VMM) which is a piece of software, firmware, or hardware which can also create and run the virtual machines. Further, the contention events may be normal or abnormal which may be detected and resolved using a method or apparatus in accordance with one or more of the disclosed embodiments herewith.

Figure 1B:
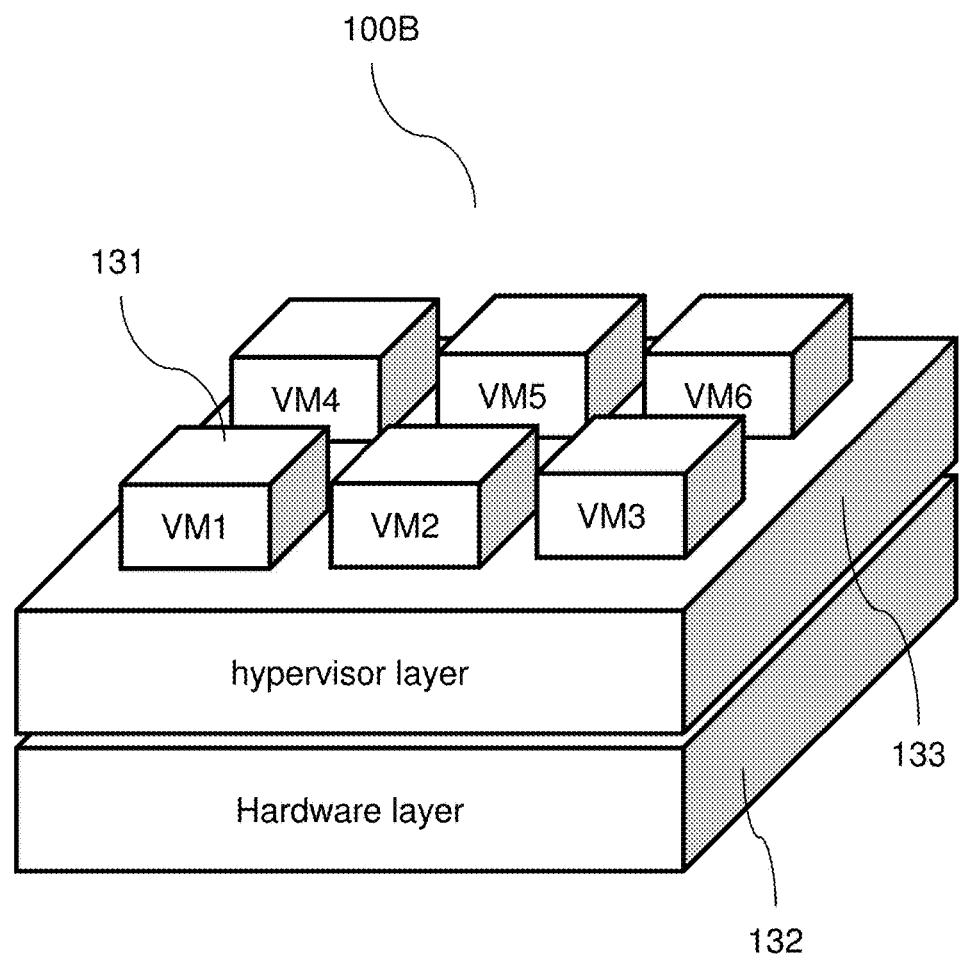
FIG. 1B depicts a block diagram of a computer system in accordance with some embodiments of this disclosure.

FIG. 1B depicts a block diagram of a computer system 100B in accordance with some embodiments of this disclosure. As shown in this embodiment the virtual machines, for example virtual machine 131 (VM1), are shown implemented on a hypervisor layer which is a virtualization layer than can create the virtual machines and control the operation and execution of the virtual machine processes and operations. The computer system 100B includes a hardware layer 132 which can contain similar elements to those shown in FIG. 1A. The computer system 100B also includes a virtualization layer call a hypervisor layer 133 that is used to create and control the virtual machines VM1-VM6 as shown implement on the virtualization layer.

Figure 1C:
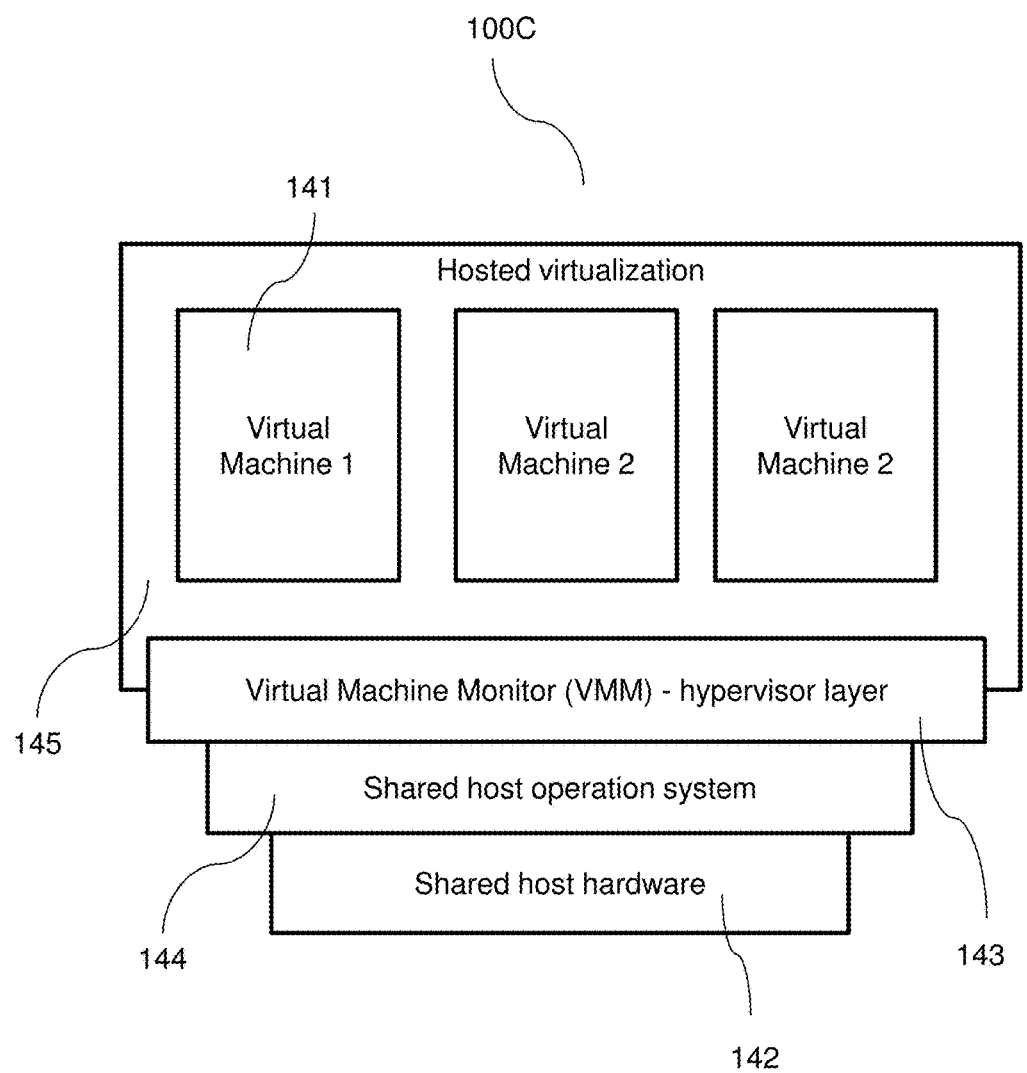
FIG. 1C depicts a block diagram of a computer system in accordance with some embodiments of this disclosure.

FIG. 1C depicts a block diagram of another computer system 100C in accordance with some embodiments of this disclosure. The computer system 100C contain a shared host hardware layer 142 that is similar the hardware layer 132 of FIG. 1B and the hardware shown in FIG. 1A. The computer system 100C also has a virtual machine monitor (VMM) which is also called a hypervisor layer 143 that is similar to the hypervisor layer 133 of FIG. 1B. This computer system 100C also includes a shared host operation system 144 that operates on the shared host hardware 142 and upon which the hypervisor layer 143 will operate when creating and controlling a hosted virtualization 145. The hosted virtualization contains a plurality of virtual machines such as virtual machine 1 141, virtual machine 2, and virtual machine 3.

Figure 2A:
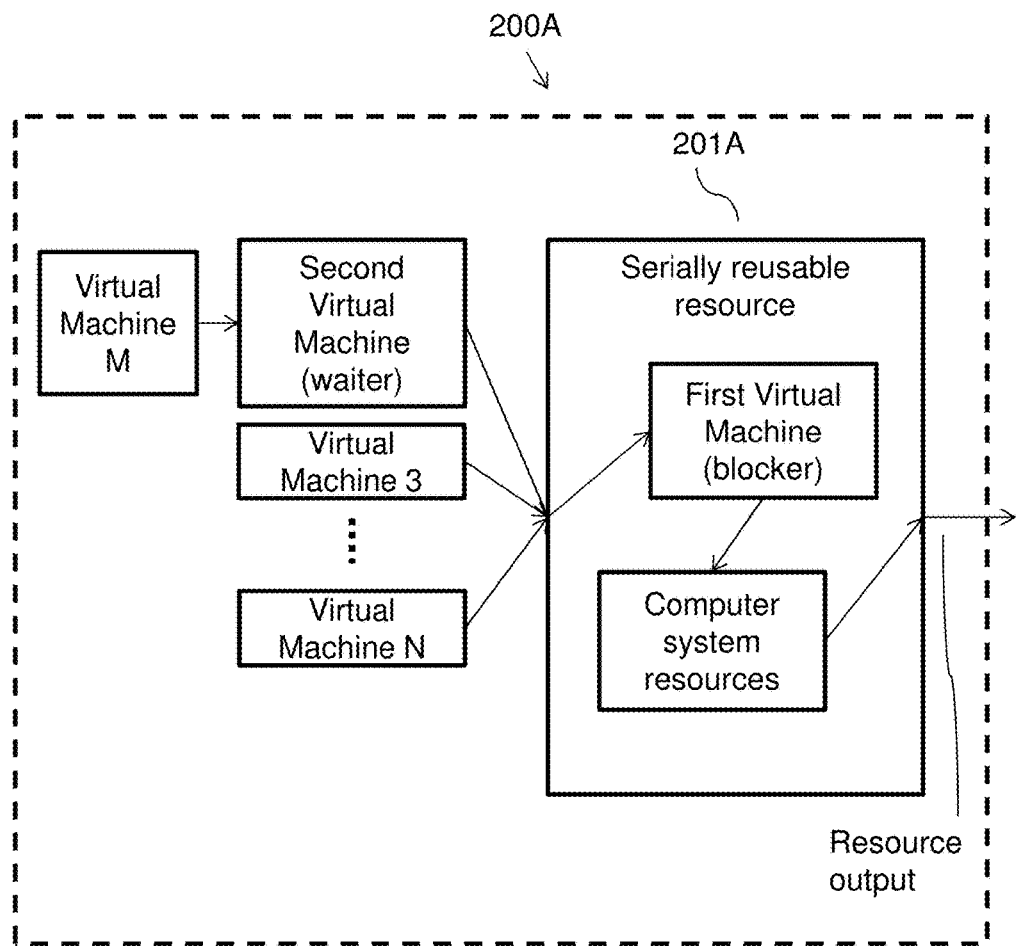
FIG. 2A depicts a block diagram of a computer system for implementing some or all aspects of the computer system for resolving abnormal contention, according to some embodiments of this disclosure.

FIG. 2A depicts a block diagram of a system for implementing some or all aspects of a computer system 200A for resolving abnormal contention, according to some embodiments of this disclosure. The computer system 200A can be a single computer, or any one or more sub-elements as shown in FIG. 1A or can be one of the computer systems shown in either FIG. 1B or FIG. 1C. In other embodiments, the computer system can be a cluster of computers or can take on another physical structure with additional software or firmware layers of which one is a hypervisor layer.

Turning now to the other elements shown in FIG. 2A, the serially reusable resource 201A is shown having a serial path through which virtual machines and their processes/operations are received, queued, processed, and outputs are transmitted. For example, a first virtual machine (blocker) is shown holding and using the serially reusable resource 201A. As shown, the first virtual machine (blocker) is communicatively connected to computer system resources which process the operations of the first virtual machine (blocker). As shown, the computer system resources are part of the serially reusable resource that the first virtual machine is holding and using to the exclusion of other virtual machines. Once processed the first virtual machine (blocker) will be released along the resource output path shown.

A second virtual machine (waiter) can send request and queue up for processing and use of the serially reusable resource 201A. As shown the second virtual machine (waiter) can remain within the computer system 200A but is in a queue waiting to access and use the serially reusable resource that is currently being blocked or held by the first virtual machine (blocker) which has temporary ownership. Further other virtual machines can queue up and wait to access the serially reusable resource 201A. For example virtual machine 3 through virtual machine N can queue up in parallel with the second virtual machine (waiter). In one embodiment the virtual machine with the highest priority will gain access to the serially reusable resource 201A once it is released by the first machine (blocker). In another embodiment the virtual machine that will be granted access to the serially reusable resource can be selected based on a first come first serve basis, or alternatively, based on another selecting scheme such as based on process/operation count and processing size. According to another embodiment, a virtual machine M can also queue up for using the serially reusable resource 201A in series behind, for example, the second virtual machine (waiter). According to one or more embodiments, the serially reusable resource 201 can be serialized via any serialization method which may be operating system dependent as well as programming language dependent (e.g., mutex, semaphore, enqueue, latch, lock, etc.).

In these embodiments, the virtual machines are serially processed by the serially reusable resource 201A. Thus, the currently processing first virtual machine (blocker) can cause a delay for the other virtual machines that are queued up after the currently processing first virtual machine (blocker). Such a delay is called a contention event which can be a normal contention event if the amount of the delay consumes the expect amount of time and/or processing resources. However, the contention event may be an abnormal contention event if the first virtual machine (blocker) usage of the serially reusable resource 201A exceeds certain thresholds. This abnormal contention can be detected and resolved by implementing a system and method according to the disclosed one or more embodiments of the disclosure.

Figure 2B:
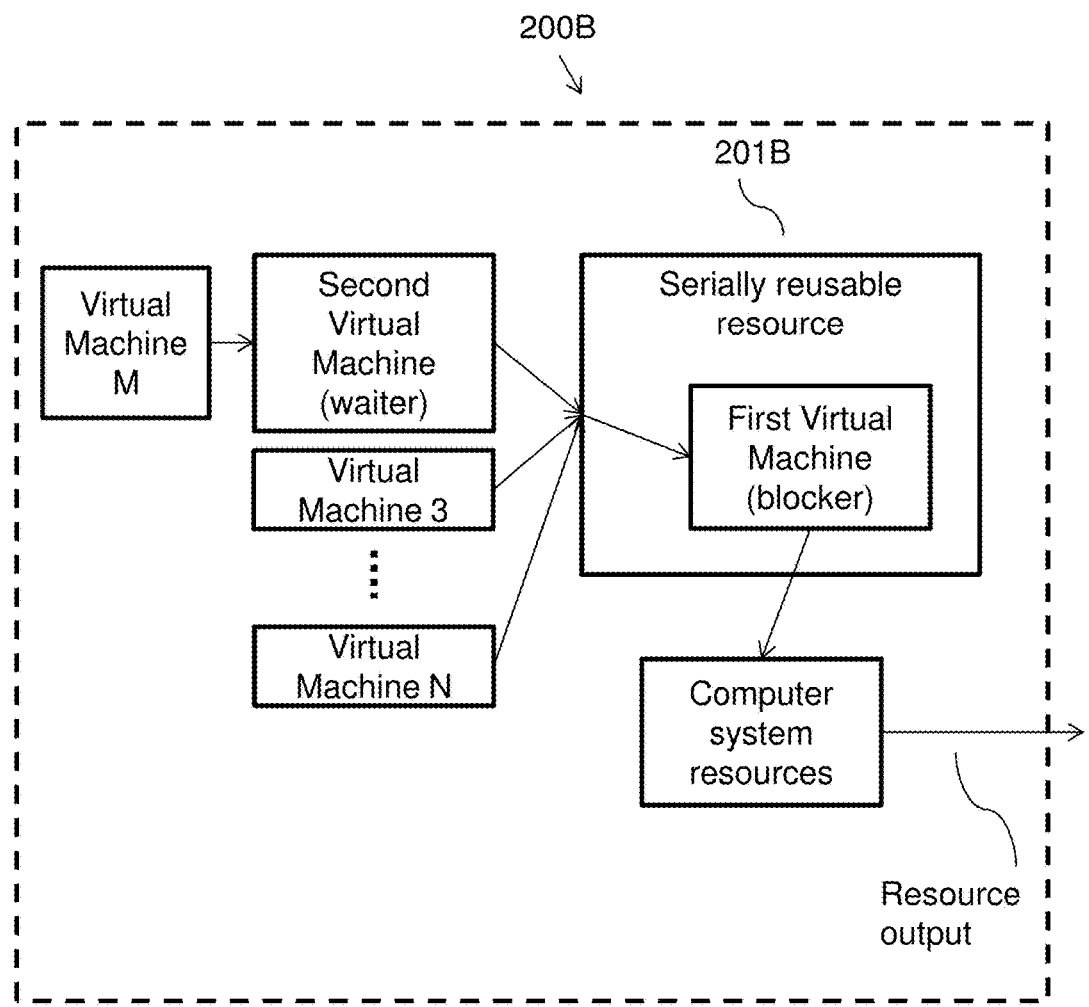
FIG. 2B depicts a block diagram of a computer system for implementing some or all aspects of the computer system for resolving abnormal contention, according to some embodiments of this disclosure.

Turning now to FIG. 2B, a block diagram of a system for implementing some or all aspects of a computer system 200B for resolving abnormal contention, according to some embodiments of this disclosure. The computer system 200B can be a single computer, or any one or more sub-elements as shown in FIG. 1. In other embodiments, the computer system can be a cluster of computers or can take on another physical structure.

Turning now to the other elements shown in FIG. 2B, the serially reusable resource 201B is shown having a serial path through which virtual machines and their processes/operations are received, queued, processed, and outputs are transmitted. For example, a first virtual machine (blocker) is shown holding and using the serially reusable resource 201B. As shown, the first virtual machine (blocker) is communicatively connected to computer system resources which process the operations of the first virtual machine (blocker). As shown, the computer system resources are separate from the serially reusable resource that the first virtual machine is holding and using to the exclusion of other virtual machines. Once processed the first virtual machine (blocker) will be released along the resource output path shown.

A second virtual machine (waiter) can queue up for the serially reusable resource 201B. As shown the second virtual machine (waiter) can remain within the computer system 200B but is in a queue waiting to access and use the serially reusable resource that is currently being blocked or held by the first virtual machine (blocker) which has temporary ownership. Further other virtual machines can queue up and wait to access the serially reusable resource 201B. For example virtual machine 3 through virtual machine N can queue up in parallel with the second virtual machine (waiter). In one embodiment the virtual machine with the highest priority will gain access to the serially reusable resource 201B once it is released by the first machine (blocker). In another embodiment the virtual machine that will be granted access to the serially reusable resource can be selected based on a first come first serve basis, or alternatively, based on another selecting scheme such as based on process/operation count and processing size. According to another embodiment, a virtual machine M can also queue up for using the serially reusable resource 201B in series behind, for example, the second virtual machine (waiter).

In these embodiments, the virtual machines are serially processed by the serially reusable resource 201B. Thus, the currently processing first virtual machine (blocker) can cause a delay for the other virtual machines that are queued up after the currently processing first virtual machine (blocker). Such a delay is called a contention event which can be a normal contention event if the amount of the delay consumes the expect amount of time and/or processing resources. However, the contention event may be an abnormal contention event if the first virtual machine (blocker) usage of the serially reusable resource 201B exceeds certain thresholds. This abnormal contention can be detected and resolved by implementing a system and method according to the disclosed one or more embodiments of the disclosure.

Figure 3:
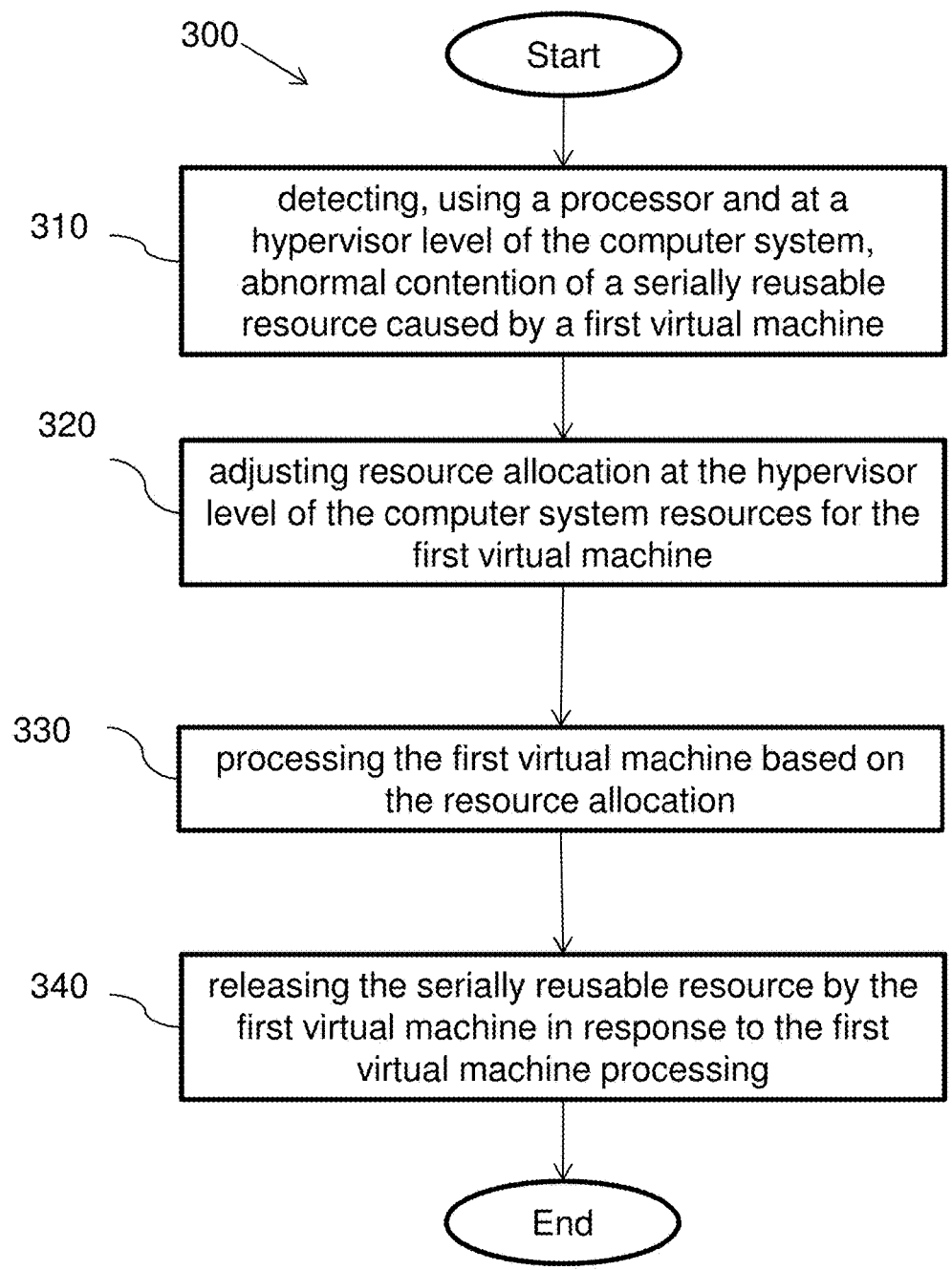
FIG. 3 depicts a process flow of a method for resolving abnormal contention in accordance with some embodiments of this disclosure.

FIG. 3 depicts a process flow of a method 300 for resolving abnormal contention in accordance with some embodiments of this disclosure. The method 300 includes detecting, using a processor and at a hypervisor level of the computer system, abnormal contention of a serially reusable resource caused by a first virtual machine (operation 310). The abnormal contention includes the first virtual machine experiencing resource starvation of computer system resources used for processing the first virtual machine, causing the first virtual machine to block the serially reusable resource from a second virtual machine that is waiting to use the serially reusable resource. The method 300 includes adjusting resource allocation at the hypervisor level of the computer system resources for the first virtual machine (operation 320). The method 300 also includes processing the first virtual machine based on the resource allocation (operation 330). Further, the method 300 includes releasing the serially reusable resource by the first virtual machine in response to the first virtual machine processing (operation 340).

According to one or more embodiment, resource starvation can be caused from one or more selected from a group consisting of processor resource starvation, memory resource starvation, and data bandwidth limitation. According to another embodiment, the method 300 may further include storing historical data from the abnormal contention, and creating, using the historical data, a time series model to model computer system behavior based on abnormal contention of the serially reusable resource over time. The time series model can be further updated periodically based on additional contention events. Further, this embodiment of method 300 can further include taking system measurements after releasing the serially reusable resource, storing the system measurements along with the historical data, and using the system measurements and historical data to update the time series model.

According to another embodiment, adjusting resource allocation at the hypervisor level of the computer system resources for the first virtual machine affects all processor resources assigned to the first virtual machine and the second virtual machine. Further, according to another embodiment, adjusting resource allocation at the hypervisor level of the computer system resources for the first virtual machine can include granting access to processor resources of the second virtual machine. Alternatively, another embodiment can instead include granting access to spare processor resources available on the computer system. Further, according to another embodiment, access can be granted to at least one of available memory resources and network bandwidth.

Figure 4:
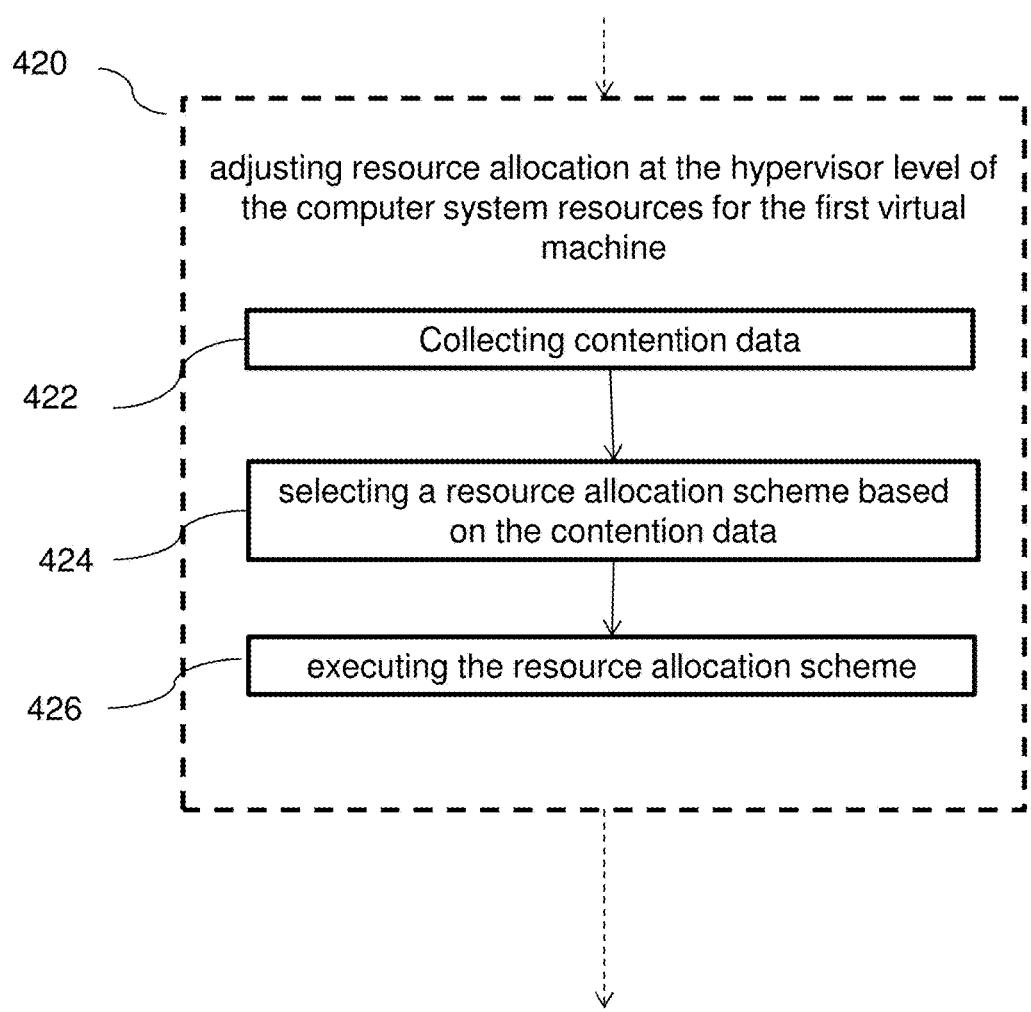
FIG. 4 depicts a process flow of adjusting resource allocation for a method for resolving abnormal contention in accordance with some embodiments of this disclosure.

FIG. 4 depicts a process flow of adjusting resource allocation 420 for a method for resolving abnormal contention in accordance with some embodiments of this disclosure. Adjusting resource allocation 420 includes collecting contention data from the serially reusable resource that may be blocked or held on the computer system and processes from the first virtual machine and the second virtual machine that request and wait for the serially reusable resource that may blocked or held to be released (operation 422). Adjusting resource allocation 420 also includes selecting a resource allocation scheme based on the contention data (operation 424). Further, adjusting resource allocation 420 includes executing the resource allocation scheme (operation 426). The resource allocation scheme can be, but is not limited to, being one selected from a group consisting of: adjusting resource priority values of the first virtual machine and the second virtual machine; readjusting resource priority values of the first virtual machine and the second virtual machine; adjusting priorities of all virtual machines in the system; and terminating and removing the first virtual machine, allowing the second virtual machine to begin processing. Further, according to another embodiment, adjusting priorities of all virtual machines in the computer system can also include lowering the priorities of all the virtual machines in the computer system.

The resource allocation scheme can be, but is not limited to, being one selected from a group consisting of: adjusting resource priority values of the first virtual machine and the second virtual machine; readjusting resource priority values of the first virtual machine and the second virtual machine; adjusting priorities of all virtual machines in the system; and terminating and removing the first virtual machine, allowing the second virtual machine to begin processing. Further, according to another embodiment, selecting a resource allocation scheme (operation 523) can include selecting the resource allocation scheme based on the resource allocation scheme that is least destructive to the processes of the first virtual machine. According to another embodiment, selecting a resource allocation scheme can further include selecting the resource allocation scheme that is least destructive based on how many attempts are made to fix the abnormal contention.

According to one or more embodiments, selecting a resource allocation scheme based on the contention data further includes detecting abnormal contention events of the first virtual machine which are duplicates of events that have already been processed and counting how many times such events are detected, determining whether the abnormal contention is resolved based on the detecting abnormal contention events and the counting how many times such events are detected, selecting the resource allocation scheme based on whether the abnormal contention persisted after using another resource allocation scheme to try to remedy the abnormal contention, and escalating to the selected resource allocation scheme in response to the another resource allocation scheme failing to remedy the abnormal contention.

According to one or more embodiments, a virtual machine guest can be blocking a shared resource for an abnormal, and possibly unacceptable, amount of time while it is being starved for processor resource in a constrained environment, such as when the entire computer system is run at full utilization. When such a starved virtual machine guest is causing an abnormal contention, processing as disclosed herein is invoked that detects and helps resolve the abnormal contention. This processing operates at the hypervisor level.

According to one or more embodiments, the abnormal contention may be resolved by adjusting a processing cap. Specifically, the blocker, which may also be called a holder's virtual machine, can be "capped" which is defined as when the blocker is prevented from using more resources even though there are more resources available on the physical real machine. When the blocker is capped, one or more embodiments can provide processing at the hypervisor level that can define that the capped virtual machine can temporarily obtain more resources in order to alleviate the abnormal contention. In one or more embodiments there exist more resources on the physical machine that can be allocated, so the capped virtual machine that is blocking can be given more resources without involving taking resource from other virtual machines. In another embodiment, if the physical machine becomes fully utilized, then it becomes a scenario were other processing operations can be implemented to help resolve the abnormal contention. For example, weight values for each virtual machine can be adjusted appropriately.

For example, according to one or more embodiments, when a currently processing virtual guest machine (blocker) blocks a serialization resource that is shared with other images, causing an abnormal contention, the priorities of the blocker and first of the virtual guest machines (waiter) waiting and queued for processing are compared. If the waiter priority is higher, the two are temporarily adjusted. For example, the blocker priority may be increased and the waiter priority may be lowered. By raising the priority of the blocker, and lowering the priority of the waiter and/or other virtual guest machines, the blocker is enabled to complete its serialized processing and release the shared resource. According to one or more embodiments, because the priority adjustment is done at the hypervisor level, the adjustment may affect all processor resources assigned to the blocker and waiter guests.

According to an embodiment, processing begins when an abnormal contention event is detected by one of the virtual guest machine systems. The abnormal contention event is likely already been characterized as abnormal and is likely being caused at least in part by starvation of physical CPU resources. Once an abnormal contention is detected, a hypervisor level processor begins dispatch processing and adjustments are made to the priority of a blocking system image (blocker) and the first waiting system image (waiter).

For example, in accordance with an embodiment, an abnormal contention can be caused when the blocking virtual guest machine image is not receiving execution time slices from any logical processors due to being low in priority, and/or is being preempted by higher priority images (e.g. a blocking image with Low LPAR weights). In order to being resolving the abnormal contention, a change in hypervisor logical processor dispatch priority of the blocker and waiter images will be performed. For example, if the priority of the blocker is lower than the waiter then the blocker is increased to some level above the waiter (e.g. 10%) and the waiter is decreased by 10%, to allow the blocker to complete its serialized processing and release the serialization resource.

In accordance with another embodiment, an abnormal contention can be caused when the blocker virtual machine image is receiving insufficient execution time due to processor resource configuration constraints (e.g. LPAR Soft-Capping, Uni-processor, or non-dedicated processor images). In order to being resolving the abnormal contention, temporarily, the blocker will be allowed to access processor resources of the waiter. In another embodiment the blocker will be allowed to access spare resources available on the system.

According to other embodiments, if the abnormal contention persists after the temporary adjustment expires, other measures are taken. For example, priority adjustments are done in increasing increments (e.g. 20%, 30%, 40%, etc. . . . ).

According to another embodiment, if the abnormal contention still exists, additional virtual guest machines will be lowered in priority to remove them from competition for processor resources. For example, in accordance with an embodiment, first other waiters can have their priorities lowered followed by other higher priority images having their priorities lowered.

Further, according to another embodiment, if the abnormal contention still exists when all possible images have been considered for priority adjustment the blocker image may be stopped and removed from the cluster in order to relinquish the blocked resource, then restarted, and allowed to rejoin the cluster.

In another embodiment, if the blocker resides on a different physical computer system than the waiter(s), a signal is sent to the hypervisor level processing system where the blocker resides.

In accordance with one or more of the disclosed embodiments, one or more of the following benefits and/or advantages can be provided. Particularly, while disclosed embodiments uses the established concept of accelerating a blocker, one or more embodiments can also decreases the priority of the first waiter as well in order to remove even more competition for CPU resources. Further, one or more embodiments can take into account factors which are external to the virtual machine, which can also be called a virtual system image, by operating at the hypervisor level. One or more embodiments can also consider a computer system environment where a hypervisor is managing several virtual machine images running on the same physical machine.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:
1. A computer implemented method comprising:
   operations to resolve abnormal contention on a computer system, the operations comprising:
      detecting, using a processor and at a hypervisor level of the computer system, abnormal contention of a serially reusable resource caused by a first virtual machine, wherein the abnormal contention includes the first virtual machine experiencing resource starvation of computer system resources used for processing the first virtual machine, causing the first virtual machine to block the serially reusable resource from a second virtual machine that is waiting to use the serially reusable resource;
      in response to the detecting, using the processor and at the hypervisor level of the computer system, the abnormal contention of the serially reusable resource caused by the first virtual machine, collecting resource data in a serialized resource history database and analyzing the resource data associated with the serially reusable resource;
      in response to the collecting the resource data and the analyzing the resource data associated with the serially reusable resource, adjusting resource allocation at the hypervisor level of the computer system resources for the first virtual machine;
      in response to the adjusting the resource allocation at the hypervisor level of the computer system resources for the first virtual machine, processing the first virtual machine based on the adjusted resource allocation; and
      in response to the processing the first virtual machine based on the adjusted resource allocation, releasing the serially reusable resource by the first virtual machine.
2. The computer implemented method of claim 1, wherein adjusting resource allocation at the hypervisor level of the computer system resources for the first virtual machine comprises:

collecting contention data from the serially reusable resource and processes from the first virtual machine and the second virtual machine that request and wait for the serially reusable resource;

selecting a resource allocation scheme based on the contention data; and executing the resource allocation scheme.

3. The computer implemented method of claim 2, wherein the resource allocation scheme is at least one selected from a group consisting of:

adjusting resource priority values of the first virtual machine and the second virtual machine;

readjusting resource priority values of the first virtual machine and the second virtual machine;

adjusting priorities of all virtual machines in the computer system; and terminating and removing the first virtual machine, allowing the second virtual machine to begin processing.

4. The computer implemented method of claim 3, wherein adjusting priorities of all virtual machines in the computer system comprises:

lowering the priorities of all the virtual machines in the computer system.

5. The computer implemented method of claim 2, wherein selecting a resource allocation scheme based on the contention data comprises:

selecting the resource allocation scheme based on the resource allocation scheme that is least destructive to the processes of the first virtual machine.

6. The computer implemented method of claim 5, wherein selecting a resource allocation scheme based on the contention data further comprises:

detecting abnormal contention events of the first virtual machine which are duplicates of events that have already been processed and counting how many times such events are detected;

determining whether the abnormal contention is resolved based on the detecting abnormal contention events and the counting how many times such events are detected;

selecting the resource allocation scheme based on whether the abnormal contention persisted after using another resource allocation scheme to try to remedy the abnormal contention; and escalating to the selected resource allocation scheme in response to the another resource allocation scheme failing to remedy the abnormal contention.

7. The computer implemented method of claim 1, wherein resource starvation is caused from one or more selected from a group consisting of processor resource starvation, memory resource starvation, and data bandwidth limitation.

8. The computer implemented method of claim 1, wherein adjusting resource allocation at the hypervisor level of the computer system resources for the first virtual machine affects all processor resources assigned to the first virtual machine and the second virtual machine.

9. The computer implemented method of claim 1, wherein adjusting resource allocation at the hypervisor level of the computer system resources for the first virtual machine comprises:

granting access to processor resources of at least one of the second virtual machine and spare processor resources available on the computer system.

10. The computer implemented method of claim 1, wherein adjusting resource allocation at the hypervisor level of the computer system resources for the first virtual machine comprises:

granting access to at least one of available memory resources and network bandwidth.

11. A computer system comprising:

a memory having computer readable instructions to resolve abnormal contention; and one or more processors for executing the computer readable instructions, the computer readable instructions comprising:

detecting, using a processor and at a hypervisor level of the computer system, abnormal contention of a serially reusable resource caused by a first virtual machine, wherein the abnormal contention includes the first virtual machine experiencing resource starvation of computer system resources used for processing the first virtual machine, causing the first virtual machine to block the serially reusable resource from a second virtual machine that is waiting to use the serially reusable resource;

in response to the detecting, using the processor and at the hypervisor level of the computer system, the abnormal contention of the serially reusable resource caused by the first virtual machine, collecting resource data in a serialized resource history database and analyzing the resource data associated with the serially reusable resource;

in response to the collecting the resource data and the analyzing the resource data associated with the serially reusable resource, adjusting resource allocation at the hypervisor level of the computer system resources for the first virtual machine;

in response to the adjusting the resource allocation at the hypervisor level of the computer system resources for the first virtual machine, processing the first virtual machine based on the adjusted resource allocation; and in response to the processing the first virtual machine based on the adjusted resource allocation, releasing the serially reusable resource by the first virtual machine.

12. The computer system of claim 11, wherein adjusting resource allocation at the hypervisor level of the computer system resources for the first virtual machine comprises:

collecting contention data from the serially reusable resource and processes from the first virtual machine and the second virtual machine that request and wait for the serially reusable resource;

selecting a resource allocation scheme based on the contention data; and executing the resource allocation scheme.

13. The computer system of claim 12, wherein the resource allocation scheme is at least one selected from a group consisting of:

adjusting resource priority values of the first virtual machine and the second virtual machine;

readjusting resource priority values of the first virtual machine and the second virtual machine;

adjusting priorities of all virtual machines in the computer system; and terminating and removing the first virtual machine, allowing the second virtual machine to begin processing.

14. The computer system of claim 13, wherein adjusting priorities of all virtual machines in the computer system comprises:

lowering the priorities of all the virtual machines in the computer system.

15. The computer system of claim 12, wherein selecting a resource allocation scheme based on the contention data comprises:
- selecting the resource allocation scheme based on the resource allocation scheme that is least destructive to the processes of the first virtual machine; and
- selecting the resource allocation scheme that is least destructive based on how many attempts are made to fix the abnormal contention.

16. The computer system of claim 15, wherein selecting a resource allocation scheme based on the contention data further comprises:
- detecting abnormal contention events of the first virtual machine which are duplicates of events that have already been processed and counting how many times such events are detected;
- determining whether the abnormal contention is resolved based on the detecting abnormal contention events and the counting how many times such events are detected;
- selecting the resource allocation scheme based on whether the abnormal contention persisted after using another resource allocation scheme to try to remedy the abnormal contention; and
- escalating to the selected resource allocation scheme in response to the another resource allocation scheme failing to remedy the abnormal contention.

17. A computer program product comprising a computer readable storage medium having program instructions embodied therewith, the program instructions executable by a processor to cause the processor to:
- detect, at a hypervisor level of a computer system, abnormal contention of a serially reusable resource caused by a first virtual machine,
- wherein the abnormal contention includes the first virtual machine experiencing resource starvation of computer system resources used for processing the first virtual machine, causing the first virtual machine to block the serially reusable resource from a second virtual machine that is waiting to use the serially reusable resource;
  - in response to the detecting, using the processor and at the hypervisor level of the computer system, the abnormal contention of the serially reusable resource caused by the first virtual machine, collecting resource data in a serialized resource history database and analyzing the resource data associated with the serially reusable resource;
- in response to the collecting the resource data and the analyzing the resource data associated with the serially reusable resource, adjust resource allocation at the hypervisor level of the computer system resources for the first virtual machine;
- in response to the adjusting the resource allocation at the hypervisor level of the computer system resources for the first virtual machine, process the first virtual machine based on the adjusted resource allocation; and
- in response to the processing the first virtual machine based on the adjusted resource allocation, release the serially reusable resource by the first virtual machine.

18. The computer program product for resolving abnormal contention of claim 17, where adjusting resource allocation at the hypervisor level of the computer system resources for the first virtual machine comprises program instructions executable by the processor to cause the processor to:
- collecting contention data from the serially reusable resource and processes from the first virtual machine and the second virtual machine that request and wait for the serially reusable resource;
- select a resource allocation scheme based on the contention data; and
- execute the resource allocation scheme, wherein the resource allocation scheme is at least one selected from a group consisting of:
- adjusting resource priority values of the first virtual machine and the second virtual machine;
- readjusting resource priority values of the first virtual machine and the second virtual machine;
- adjusting priorities of all virtual machines in the computer system; and terminating and removing the first virtual machine, allowing the second virtual machine to begin processing.

19. The computer program product for resolving abnormal contention of claim 18, wherein adjusting priorities of all virtual machines in the computer system comprises:
- lowering the priorities of all the virtual machines in the computer system.

20. The computer program product for resolving abnormal contention of claim 18, wherein selecting a resource allocation scheme based on the contention data comprises:
- selecting the resource allocation scheme based on the resource allocation scheme that is least destructive to the processes of the first virtual machine;
- selecting the resource allocation scheme that is least destructive based on how many attempts are made to fix the abnormal contention;
- detecting abnormal contention events of the first virtual machine which are duplicates of events that have already been processed and counting how many times such events are detected;
- determining whether the abnormal contention is resolved based on the detecting abnormal contention events and the counting how many times such events are detected;
- selecting the resource allocation scheme based on whether the abnormal contention persisted after using another resource allocation scheme to try to remedy the abnormal contention; and
- escalating to the selected resource allocation scheme in response to the another resource allocation scheme failing to remedy the abnormal contention.

* * * * *